United States Patent [19]
Ohrui et al.

[11] 3,875,212
[45] Apr. 1, 1975

[54] PROCESS FOR CONTINUOUSLY SYNTHESIZING ACRYLIC ACID ESTERS

[75] Inventors: Tetsuya Ohrui, Niihama; Yasuhito Sakakibara, Saijo; Yukinaga Aono; Michio Kato; Hiroshi Takao; Tsunejiro Kawaguchi, Niihama, all of Japan

[73] Assignee: Sumitomo Chemical Company, Limited, Osaka, Japan

[22] Filed: May 21, 1973

[21] Appl. No.: 362,202

[52] U.S. Cl............................................ 260/486 R
[51] Int. Cl............................................ C07c 69/54
[58] Field of Search .............................. 260/486 R

[56] References Cited
UNITED STATES PATENTS
2,916,512  12/1959  Fisher et al. ................... 260/486 R
3,354,199  11/1967  Lachowicz et al. ............. 260/486 R Primary Examiner—Lorraine A. Weinberger
Assistant Examiner—Paul J. Killos
Attorney, Agent, or Firm—Stevens, Davis, Miller & Mosher

[57] ABSTRACT

Acrylic acid esters such as methyl acrylate or ethyl acrylate are continuously synthesized by esterifying one part by mole of acrylic acid with 2.0 to 3.0 parts by mole of methanol or 1.5 to 2.5 parts by mole of ethanol in the presence of 0.1 to 1.0 part by mole of a water-insoluble and unreactive organic solvent, such as a linear, cyclic or aromatic hydrocarbon compound having a boiling point of 100° to 160°C and sulfuric acid having a concentration of 5 to 50 % by weight in an esterification solution as a catalyst at boiling temperature, for example, 50° to 100°C approximately under atmospheric pressure, while azeotropically boiling water formed in the esterification together with the organic solvent and distilling acrylic acid esters simultaneously, thereby keeping the concentration of sulfuric acid constant in the esterification solution; separating the resulting effluent esterification solution into an organic solvent layer and an aqueous layer by decantation; recycling the aqueous layer containing sulfuric acid to the esterification; separating and recovering the resulting ester and organic solvent contained in the organic solvent layer by steam distillation from the resulting polymers and high boiling materials; and leading the ester and organic solvent to further purification together with the resulting distillation of the esterification.

11 Claims, 1 Drawing Figure

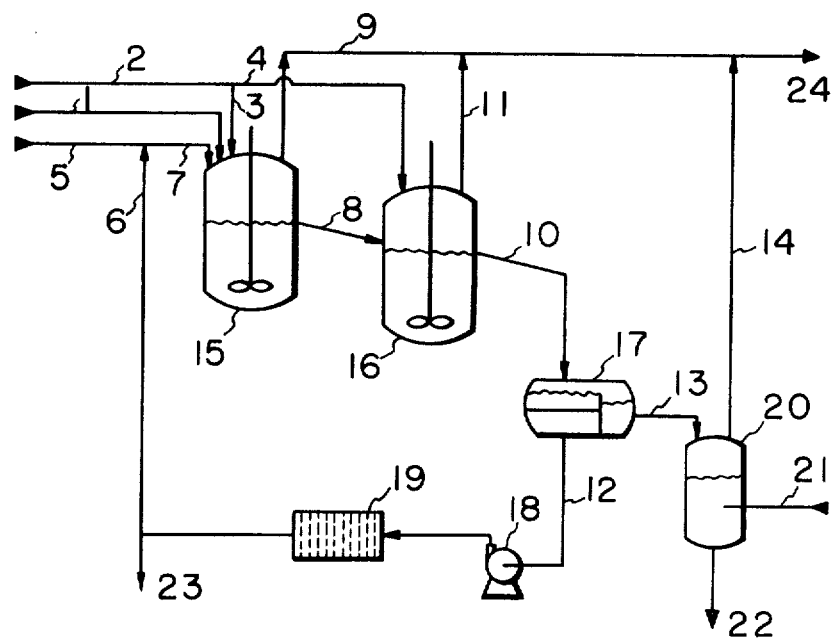

PROCESS FOR CONTINUOUSLY SYNTHESIZING ACRYLIC ACID ESTERS

This invention relates to an improved process for continuously synthesizing an acrylic acid ester, particularly methyl acrylate or ethyl acrylate.

To avoid complicacy of the description, the explanation will be concentrated mainly on a process for methylesterification of acrylic acid in the description which follows, but the quite same explanation is applicable to a process for ethylesterification of acrylic acid, unless otherwise especially mentioned.

Heretofore, it has been proposed that methylesterification of acrylic acid be carried out in a stirred vessel-type reactor, using sulfuric acid or sulfonic acids as a catalyst, while adding methanol to the reactor. However, in said process, the formed water leaves the reaction system, and therefore the prior art process is disadvantageous from the viewpoint of reaction equilibrium. That is, only when a large amount, for example, 5 to 7 moles of methanol, is added to one mole of acrylic acid, can an effective reaction rate and conversion be obtained. The resulting methyl acrylate azeotropically boils together with water, but the azeotropic composition is rich in methyl acrylate. Therefore, the concentration of water is considerably increased in the continuous reactor, and this is not favorable for the esterification reaction. The almost same situation prevails also in the ethylesterification. Furthermore, the residual liquid resulting from separation of methyl acrylate and methanol from the reaction solution is a contaminated dilute sulfuric acid solution containing polymers and high boiling materials, and is discarded after neutralization with an alkali. For example, it has been proposed that the residual liquid be freed from the polymers, concentrated and reused in the esterification reaction, but the polymers resulting from the esterification reaction are tarry materials and are liable to stick to vessel walls. Therefore, it is impossible to separate the polymers from the residual liquid by a proper separating operation, for example, filtration, etc. Even if the polymers are removed from the residual liquid by some means, dissolved polymers, etc. will be again deposited when the resulting residual liquid is concentrated.

In order to make the reaction equilibrium favorable in the methylesterification, there has been proposed a process comprising carrying out the esterification reaction in the presence of a hydrocarbon, and extracting the resulting methyl acrylate into the hydrocarbon layer (Japanese Patent Publication No. 1444/65). The prior art process is advantageous in the reaction equilibrium and rate of methylesterification, and it is enough to add 1.0 to 2.0 moles of methanol to one mole of acrylic acid. However, in the prior art process, the esterification is not carried out while distilling off and separating water and methyl acrylate resulting from the esterification. As is apparent from said Japanese Patent Publication Specification, the esterification is carried out under reflux, and the resulting methyl acrylate is restricted to the process for extractively separating methyl acrylate by means of the hydrocarbon added. Therefore, the aqueous layer is a dilute solution of sulfuric acid, and thus must be discarded after neutralization in the same manner as described before. The problem of treating such waste acid is not only very important from the view point of preventing the public nuisance, but also impairs the process economy.

In the process for esterifying acrylic acid in the presence of such hydrocarbons as benzene, toluene, etc., the esterification reaction is carried out with higher alcohols having three or more carbon atoms (Japanese Patent Publication No. 22858/63; U.S. Pat. No. 2,917,538). In the prior art process, the esterification is carried out, while azeotropically boiling and separating the resulting water together with the hydrocarbon added. The expensive alcohol to be added can be limited to almost equal moles of acrylic acid, and further the successive separation step can be carried out with ease.

Generally, benzenesulfonic acid, etc. are used as a catalyst in place of sulfuric acid, because there is no water in the reaction system, and therefore sulfuric acid will undesirably cause carbonization of reactants and products.

However, no art of using an organic solvent or hydrocarbons has been developed yet to utilize the azeotropic relation with water in the methyl or ethylesterification reaction.

An object of the present invention is to overcome the disadvantages encountered in the prior art as described above.

According to the present invention, sulfuric acid as the catalyst can be not only recyclically used, but also the reaction equilibrium and reaction rate of methyl or ethylesterification of acrylic acid can be shifted to a very favorable direction, and thus the ester can be synthesized with ease. Furthermore, the problem of treating the waste acid is substantially completely solved, and also an improvement in consumption of sulfuric acid for the production of unit acrylic ester can be attained. Therefore, the present invention provides an economical process. Furthermore, it must be mentioned that the troubles of polymers, etc. are greatly reduced.

Now, the present invention will be explained in detail below:

According to the present invention, acrylic acid, an organic solvent and methanol or ethanol are fed, at first, to a reactor, and the esterification reaction is carried out in the presence of a sulfuric acid catalyst. The reaction is carried out at a boiling point temperatures, and the resulting water is distilled off azeotropically together with methyl acrylate and the organic solvent. The rate of water distilled off is controlled by selecting the boiling point temperature so that sulfuric acid can be contained in the reaction solution at a constant sulfuric acid concentration. The reaction solution is liable to be separated into an aqueous layer and an organic solvent layer, usually in the present invention the volume ratio of the organic solvent layer to the aqueous layer being from 1 : 9 to 7.3 in the esterification reactor, and therefore, for example, stirring is carried out to obtain a good distribution and distill off vapors of azeotropic composition satisfactorily. The reaction solution withdrawn from the reactor is separated into two layers in a decanter, and the organic solvent layer is further subjected to steam distillation, etc. to recover methyl acrylate and the organic solvent, while separating polymers, high boiling materials, etc. therefrom. When the esterification reaction is carried out under said conditions where the products are distilled off while adding the organic solvent thereto at the same time, polymers, though produced in a very small proportion, are non-sticky, finely distributed solids, which are not in a tarrry state as observed in the ordinary esterification reaction. Therefore, these solids can be very readily separated. That is, the polymers can be readily separated from the aqueous layer containing sulfuric acid from the decanter, for example, by filtration. the aqueous sulfuric acid solution thus freed from the solids including the polymers can be recyclically used in the esterification reactor.

In this manner the esterification catalyst can be effectively recovered, and in this case the problem of treating the waste acid is limited to the small amount of sulfuric acid attached to the separated solids such as polymers, and therefore substantially solved in the present invention.

As is apparent from the foregoing description, it is necessary in the esterification reaction to distill off water by an amount corresponding to the amount of water formed by the esterification reaction and water contained in acrylic acid and/or methanol. The concentration of sulfuric acid can be kept constant thereby. Preferable the concentration of sulfuric acid as a catalyst is 5 to 50 % by weight. The esterification can proceed outside the range of said preferable concentration of sulfuric acid, but the reactor capacity is increased at a lower concentration of sulfuric acid, and a higher concentration is not preferable, because coke-like polymers will sometimes form, depending upon the conditions.

In the present invention, esterification is carried out in the presence of an organic solvent, particularly, hydrocarbon having a boiling point of at least 100°C, in an esterification reactor, and the water entered into the esterification reactor, as contained in the raw material, and the water formed by the esterification are azeotropically boiled together with the organic solvent and distilled off together with the ester formed, whereby the sulfuric acid concentration is maintained constant in the esterification reactor. Not tarry or rubbery, but granular, non-sticky polymers are formed, though in a very small amount, and distributed as small particles in the solution.

Therefore, in this case the hydrocarbon is effective for distilling off unnecessary water through azeotropic boiling with water, and further for converting the resulting solids of polymers, etc. to a form easy to handle.

Unreacted methanol and acrylic acid are much distributed in an aqueous layer, and thus contained in an aqueous sulfuric acid solution separated from the reaction solution. The solid materials can be removed by simple filtration, and the aqueous sulfuric acid solution can be recycled to the esterification reactor. Addition of water or boiling of the solution is readily conceivable in a recycle line as a mere application of the present invention in establishing the water balance of the entire system.

The organic solvent can be added to acrylic acid in the esterification step, but an organic solvent obtained as an organic solvent solution of acrylic acid in the extraction step of acrylic acid from an aqueous solution containing acrylic acid can be directly used in the process of the present invention.

Methyl or ethyl esterification of acrylic acid can be conveniently carried out in a tank-type reactor in the present invention. The type of the reactor is not particularly limited, but a vigorously agitatable tank-type reactor is preferable, because there are an oil layer and water layer in the reaction solution. The number of reactors is not particularly restricted. That is, one reactor vessel or a plurality of reactor vessels connected to one another in series can be used. However, two reactor vessels connected to each other in series are most preferable in view of stability and economy of operation.

The raw material acrylic acid is supplied to the reactor together with an organic solvent insoluble in water and non-reactive wit acrylic acid, particularly linear, cyclic or aromatic hydrocarbon. In the case of a plurality of reactor tanks connected to one another in series, it is preferable to add the total amount of the raw material acrylic acid to the first reactor tank. Furthermore, it is not necessary that the raw material acrylic acid be anhydrous acrylic acid, and it is apparent that the acrylic acid containing a small amount of water is not objectionable.

The organic solvent added must be separated from the resulting methyl acrylate or ethyl acrylate, and therefore must have a boiling point at least by 20°C, preferebly by 35°C or above, higher than those of the esters. For the purpose of azeotropically distilling off water resulting from the esterification in the reactor especially an organic solvent having a boiling point of 100°C or higher is preferable. There is no upper limit to the boiling point of the organic solvent, but when steam distillation is carried out in purifying the organic solvent in the successive step, an organic solvent having a boiling point of not more than 160°C is preferable. Concretely, for example linear, cyclic or aromatic hydrocarbons having a boiling point of 100°C to 160°C, preferable aromatic hydrocarbons such as toluene, o-xylene, p-xylene, ethylbenzene and cumene, are used in the present invention as the organic solvent, because they are available at low costs. It is preferable to add 0.1 to 1.0 part by mole of the organic solvent, based on acrylic acid, to the reactor. The reaction can proceed when less than 0.1 part by mole of the organic solvent is added to the reactor, but it is not preferable to add less than 0.1 part by mole of the organic solvent, because the effect of the present invention is reduced. The reaction can also proceed when more than 1.0 part by mole of the organic solvent is added, but it is not economical and not preferable to add the organic solvent in an amount over that required.

In the case of methyl acrylate, the proportion of methanol to be fed is not especially limited, but it is preferable to add 2.0 to 3.0 moles of methanol per mole of acrylic acid to the reactor. In the case of a plurality of reactor tanks connected to one another in series, it is preferable to add methanol to the respective reactor tanks in divided portions.

In the case of ethyl acrylate, it is preferable to add 1.5 to 2.5 moles of ethanol per mole of acrylic acid to the reactor.

Sulfuric acid is most effective as te catalyst, and cheap and economical. Of course, various other sulfonic acids can be effectively used, but they are expensive and thus not necessary to use. When sulfuric acid is used, a portion of the organic solvent used is sulfonated, depending upon the reaction conditions, and the resulting sulfonic acid acts not only as the catalyst, but also behaves as equally as sulfuric acid, because the sulfonic acid is soluble in water. Preferable concentration of sulfuric acid in the reactor is 5 to 50 % be weight, preferably 5 to 30 % by weight.

Preferable reaction temperature is 50° to 100°C, particularly a boiling point of 75° to 85°C. Preferable reaction pressure is approximately atmospheric.

Now, the present invention will be explained in detail by by reference to lae drawing.

The FIG. is a schematic flow diagram showing one embodiment of the present invention, but the present invention is not limited thereto.

Raw materials acrylic acid and an organic solvent are fed to the first esterification reactor 15 through a line 1, and sulfuric acid thereto through a line 5. The raw material acrylic acid and the organic solvent can be supplied thereto through the separate lines. Methanol or ethanol is fed through a line 2, divided into lines 3 and 4 and respectively fed to the first esterification reactor 15 and the second esterification reactor 16. The number of the esterification reactors is not especially limited, but two vigorously agitatable reactor tanks connected to each othere in series are preferable. Distillate vapors of water, ester, methanol or ethanol, organic solvent, etc. are withdrawn from the first esterification reactor 15 through a line 9, and the reaction solution is fed to the second esterification reactor 16 from the reactor 15 though a line 8 by overflow. Distillate vapors of water, ester, methanol or ethanol, organic solvent, etc. are withdrawn from the second esterification reactor 16 through a line 11, and the reaction solution is sent to a decanter 17 from the reactor 16 through a line 10 by overflow. The organic solvent layer is withdrawn from the decanter 17 through a line 13, and the residual ester and organic solvent are recovered from the organic solvent layer through a line 14, for example by a steam distillation tank 20, and sent to a purification step for the ester and organic solvent together with the distillate vapors coming from the lines 9 and 11. Steam is directly blown into the tank 20 through a line 21. Polymers and high boiling materials are separated and recovered through a line 22. The aqueous layer is led to a pump 18 from the decanter 17 through a line 12, and passed through a filter 19 after increase in pressure of the aqueous layer by the pump 18. The polymers and solid materials are separated from the aqueous layer. The aqueous layer can be recovered to the outside through a line 23, or recycled to the first esterification reactor 15 through lines 6 and 7.

In this case, sulfuric acid is made up through a line 5, when required.

In this manner, an organic solvent, which is insoluble in water and is not reactive with acrylic acid, is made present in the esterification step, and is distilled off together with water formed from the esterification as well as contained in the raw materials, while keeping the water balance constant. Sulfuric acid as a catalyst can be effectively utilized by recycle. Furthermore, as is well known the esterification reaction itself is made advantageous thereby from the view point of reaction equilibrium and reaction rate. In the present invention, the resulting polymers can be converted to a readily treatable form by distilling off water from the reaction solution so as to the keep the concentration of sulfuric acid at a proper lead and making an organic solvent present in the esterification step, and thus can be readily filtered. That is, sulfuric acid can be readily recyclically used.

Now, the present invention will be explained in detail by way of examples.

Example 1

Two 1-l flasks were connected to each other in series to set up esterification reactors as shown in the Figure, and a solution of 80 wt.% acrylic acid and 20 wt.% of xylene (a mixture of o-xylen, m-xylene and p-xylene) was supplied to the esterification reactors according to the flow diagram of the Figure. Methylesterification was carried out at a temperature of 80°C with a volume of retention of 0.7 l in the first reactor and at a temperature of 82°C with a volume of retention of 0.7 l in the second reactor. The flow rate and composition at the respective parts are given in Table 1, and methyl acrylate was produced in yield of 99.0%, an catalyst sulfuric acid was recovered with a percentage recovery of 97%. The recovered sulfuric acid could be continuously reused by recycle.

Table 1

| Flow rate (g/hr) | 1<br>400.0 | 3<br>197.0 | 4<br>142.3 | 5<br>0.7 | 8<br>212.7 | 9<br>450.2 | 10<br>94.7 | 11<br>260.3 | 12<br>67.5 | 13<br>27.3 |
|---|---|---|---|---|---|---|---|---|---|---|
| Analytical values (wt.%) | | | | | | | | | | |
| Acrylic acid | 80.0 | | | | 17.3 | | 5.9 | | 7.0 | 3.3 |
| Xylene* | 20.0 | | | | 19.6 | 9.3 | 15.4 | 10.4 | 5.0 | 41.2 |
| Methanol | | 100.0 | 100.0 | | 5.8 | 16.2 | 18.3 | 47.9 | 24.3 | 3.6 |
| Methyl acrylate | | | | | 30.7 | 62.5 | 16.8 | 32.2 | 4.0 | 48.6 |
| Water | | | | 2.0 | 16.4 | 12.0 | 18.1 | 9.6 | 25.1 | 0.9 |
| Sulfuric acid | | | | 98.0 | 10.2 | | 23.0 | | 31.3 | 2.4 |
| Acrylic acid polymer | | | | | | | 2.4 | | 3.4 | |
| Temperature (°C) | | 80 | | | 80 | | 82 | 82 | | |

* a mixture of o-xylene, m-xylene and p-xylene

Example 2

Ethyl alcohol was fed through the line 2 of the flow diagram of the Figure, and both temperatures of the first and second reactors were maintained at 85°C. Ethylesterification was carried out in the same manner as in Example 1. Flow rate and composition of the respective parts are given in Table 2. Ethyl acrylate was produced in yield of 99.0%, and catalyst sulfuric acid was recovered with a percentage recovery of 96.5%.

Table 2

| | 1 | 3 | 4 | 5 | 8 | 9 | 10 | 11 | 12 | 13 |
|---|---|---|---|---|---|---|---|---|---|---|
| Flow rate (g/hr) | 400 | 287.2 | 204.6 | 0.8 | 231.5 | 528.6 | 101.4 | 334.8 | 74.2 | 27.2 |
| Analytical values (wt.%) | | | | | | | | | | |
| Acrylic acid | 80.0 | | | | 16.0 | | 6.1 | | 6.9 | 3.9 |
| Xylene* | 20.0 | | | | 20.0 | 7.2 | 16.3 | 8.9 | 5.5 | 45.7 |
| Ethanol | | 100.0 | 100.0 | | 8.0 | 19.7 | 21.4 | 54.6 | 26.5 | 7.6 |
| Ethyl acrylate | | | | | 34.8 | 61.0 | 13.1 | 32.1 | 3.7 | 38.9 |
| Water | | | | 2.0 | 11.9 | 12.1 | 19.5 | 4.4 | 26.3 | 1.2 |
| Sulfuric acid | | | | 98.0 | 9.4 | | 21.5 | | 28.3 | 2.8 |
| Acrylic acid polymers | | | | | | | 2.1 | | 2.9 | |
| Temperature (°C) | | | | | 85 | 85 | 85 | 85 | | |

*a mixture of o-xylene, m-xylene and p-xylene

What is claimed is:

1. A process for continuously synthesizing acrylic acid esters by a sulfuric acid catalyst, which comprises: 1. esterifying acrylic acid with methanol or ethanol in the presence of a water-insoluble and unreactive organic solvent selected from the group consisting of linear, cyclic and aromatic hydrocarbons having a boiling point of from 100° to 160°C., while azeotropically boiling water formed in the esterification together with the organic solvent and distilling acrylic acid esters simultaneously, thereby keeping the concentration of sulfuric acid constant in the esterification solution; 2. separating the resulting effluent esterification solution into an organic solvent layer and an aqueous layer by decantation;

2. A process according to claim 1, wherein the esterification (1) is carried out in a single stage.

3. A process according to claim 1, wherein the esterification (1) is carried out in a plurality of stages.

4. A process according to claim 1, wherein the esterification (1) is carried out at boiling temperature.

5. A process according to claim 4, wherein the esterification (1) is carried out at 50° to 100°C.

6. A process according to claim 1, wherein the esterification (1) is carried out approximately under atmospheric pressure.

7. A process according to claim 1, wherein the organic solvent is toluene, o-xylene, m-xylene, p-xylene, ethylbenzene or cumene.

8. A process according to claim 1, wherein 0.1 to 1.0 part by mole of the organic solvent is added to the esterification, on the basis of acrylic acid.

9. A process according to claim 1, wherein 2.0 to 3.0 moles of methanol per mole of acrylic acid is added to the esterification (1).

10. A process according to claim 1, wherein 1.5 to 2.5 moles of ethanol per mole of acrylic acid is added to the esterification (1).

11. A process according to claim 1, wherein the sulfuric acid has a concentration of 5 to 50% by weight in the esterification solution.

* * * * *